United States Patent
Boiron

[11] Patent Number: 6,021,949
[45] Date of Patent: Feb. 8, 2000

[54] GAMBLING CHIP WITH IDENTIFICATION DEVICE

[75] Inventor: Dominique Boiron, Beaune, France

[73] Assignee: Etablissements Bourgogne et Grasset, Savigny-les-Beaune, France

[21] Appl. No.: 08/617,840

[22] PCT Filed: Jul. 24, 1995

[86] PCT No.: PCT/FR95/00991

§ 371 Date: Mar. 13, 1996

§ 102(e) Date: Mar. 13, 1996

[87] PCT Pub. No.: WO96/03712

PCT Pub. Date: Feb. 8, 1996

[30] Foreign Application Priority Data

Jul. 26, 1994 [FR] France ..................... 94 09212

[51] Int. Cl.[7] .................................................. G06K 19/06
[52] U.S. Cl. ........................................ 235/492; 235/487
[58] Field of Search ..................... 235/492, 451, 235/493, 487

[56] References Cited

U.S. PATENT DOCUMENTS

| | | | |
|---|---|---|---|
| 4,260,881 | 4/1981 | Peterson | 235/493 |
| 4,818,855 | 4/1989 | Mongeon et al. | 235/492 X |
| 4,983,820 | 1/1991 | Dias | 235/492 |
| 5,166,502 | 11/1992 | Rendleman et al. | 235/492 |
| 5,498,859 | 3/1996 | Farmont | 235/384 |
| 5,619,066 | 4/1997 | Curry et al. | 235/492 X |

FOREIGN PATENT DOCUMENTS

| | | |
|---|---|---|
| 123557 | 10/1984 | European Pat. Off. . |
| 295085 | 12/1988 | European Pat. Off. . |
| 459722 | 12/1991 | European Pat. Off. . |
| 0646893 | 4/1995 | European Pat. Off. . |
| 0650148 | 4/1995 | European Pat. Off. . |
| 9207343 | 4/1992 | WIPO . |

*Primary Examiner*—Karl D. Frech
*Attorney, Agent, or Firm*—Greenblum & Bernstein, P.L.C.

[57] ABSTRACT

A gaming or casino token or chip includes a thick flat plastic body 12 provided with a circular through hole 14 in which an electronic identification element is placed. The casing 16 of the device is protected by two protective wafers 18 and 20. The permanent integration of the casing 16 in the body 12 is supplemented by attaching, for example by laminating, a plastic covering sheet 22 and 24 in each face 19 and 21 of the body 12. This forms a monobloc rigid assembly for the electronic identification device 15. Device 15 includes a memory which stores identification codes and an inductively coupled transmitter-receiver equipped with an antenna.

25 Claims, 2 Drawing Sheets

FIG_1
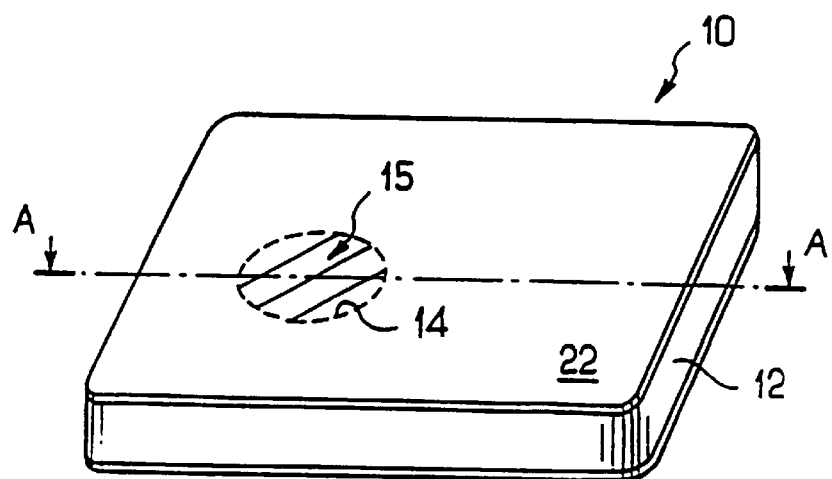
FIG_2
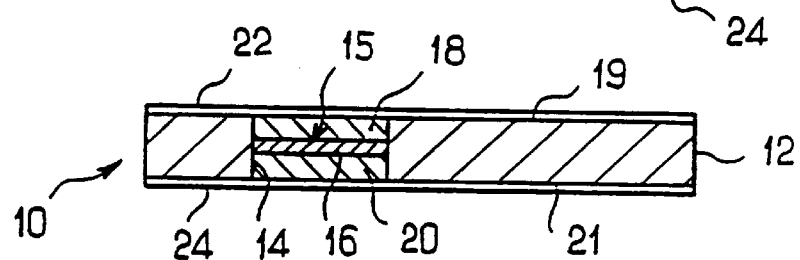
FIG_3
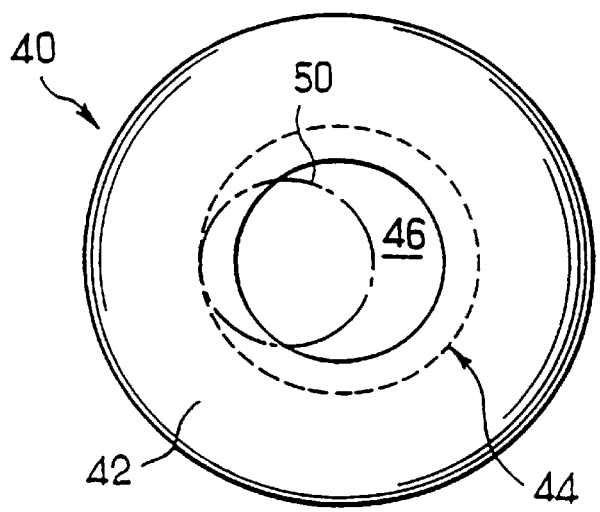
FIG_4
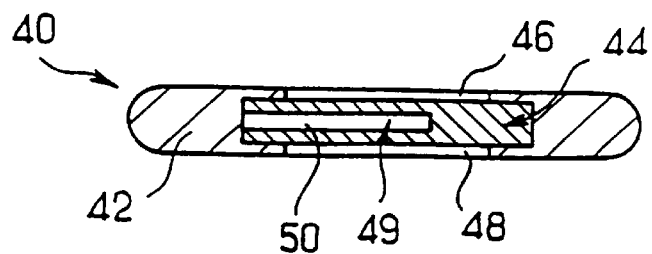

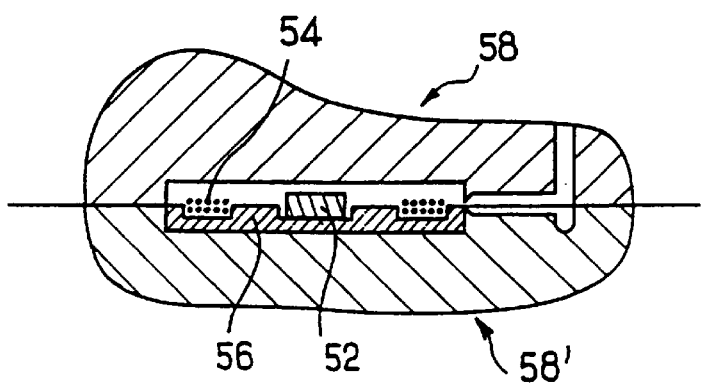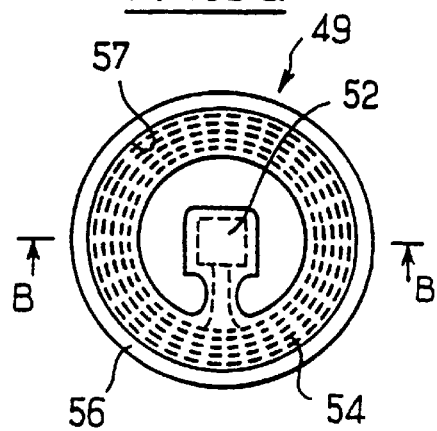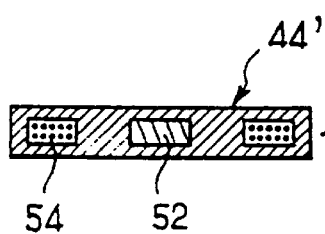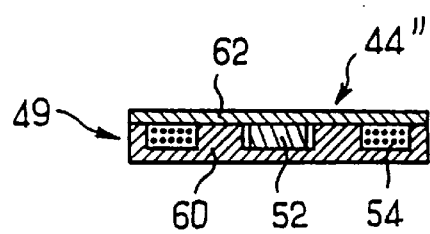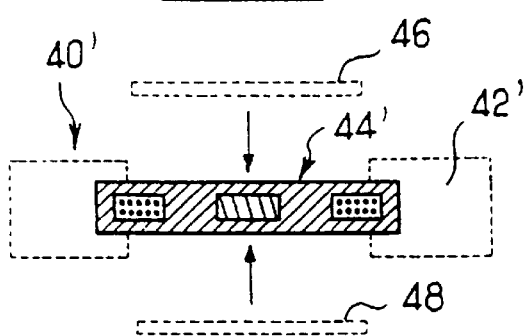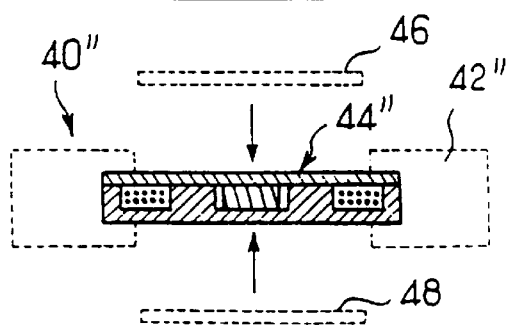

GAMBLING CHIP WITH IDENTIFICATION DEVICE

The present invention relates to gamin tokens also called casino chips. By gaming token is meant any element which can be used in gaming rooms and representing a predetermined or non-predetermined nominal value, whether this is an actual token in the form of a disk or a gaming chip generally representing a high stake. These tokens are classified into two families depending on the type of game for which they are used, "French or European" tokens with a predetermined value and "American" tokens with or without a predetermined value.

In general, the tokens are manufactured from rigid and scratch resistant plastic. The tokens exhibit varied patterns in terms of design and in terms of colors in order to reduce the risks of falsification and/or fraudulent reproductions.

With the improvement in reproduction techniques and the steady increase in stakes associated with the tokens, just the complexity of the design and of the colors proves nowadays not to be sufficient to combat fraudulent reproductions effectively. Moreover, in addition to the fight against fraud and theft, casino operators are looking to improve and facilitate the management of their gaming tables, in particular to produce a continuous inventory of the amount in play on a table and/or to monitor the value the [sic] gross contribution on a table and/or keep a track of particularly high-value tokens. In particular, a gaming token has already been proposed in which an electronic identification device is arranged in the body of the token.

The object of the invention is to provide a gaming token with an electronic identification device (also called identifier) well suited to the strict constraints resulting from the very nature of a gaming token.

Indeed, since some gaming tokens can have a high nominal value, it is important to ensure permanent attachment between the token and its identifier. In other words, the token must have a structure such that access to the identifier cannot be achieved without completely destroying the body of the token, thus preventing any falsification or substitution of the identifier.

Moreover, gaming tokens have quite a long lifetime (estimated nowadays to be five years) during which they are subjected to difficult operating conditions (permanent handling, passing through a washing machine, etc.). It is also important that the identifier be well protected both during the manufacturing stage of the token and during the period in use.

The invention provides a gaming token, or similar device representing a predetermined or non-predetermined nominal value, composed of a flat body and an electronic identification device arranged in the body of the token, characterized in that the body permanently incorporates a rigid shell made of plastic holding captive the electronic identification device.

By virtue of the invention, each token or chip can be permanently identified right from its manufacture, according to a virtually unfalsifiable numeric or alphanumeric code given by the manufacturer. The token or chip can then be easily authenticated by the users (casino operators) using a station for reading the code. This permanent identification of the token improves the security and also comes into the framework of the fight against the theft of tokens. Of course, without departing from the scope of the invention, the identification may be supplemented by other information regarding the token, for example the nominal value of the token, the code of the casino and/or of the gaming table, etc. The casino operators therefore have the possibility of immediately monitoring the amounts in play table by table, and even the movements of the players from one table to another. In some cases, especially for low value tokens, the actual identification code, specific to a given token, is not necessary; the value of the token and/or the casino code constitute the identification information relating to the token and preserved in the memory of the electronic identification device.

It should also be noted that the rigid shell provides a double function of physical protection of the electronic identification device, including its invisibility in the shell, and of guaranteeing the authenticity of the token.

Advantageously, the electronic identification device includes an electronic circuit which includes a memory carrying information regarding the token, for example an identification code and a transmitter-receiver with a peripheral antenna suitable for being supplied by inductive coupling.

Quite a simple circuit, of relatively moderate cost, is thus obtained in a small volume. In addition, the peripheral position of the antenna makes it possible to increase the effectiveness of the identifier in terms of transmission and reception, given the small volume available in the token (approximately 20 mm in diameter) for placing the identifier.

According to a preferred first embodiment of the invention, the body of the token is made of laminated or welded plastic sheets, the electronic identification device being arranged between two protective plastic wafers in an opening passing through the body, the body being covered on both its faces with covering sheets, also made of plastic, fastened to the said body by adhesive bonding, welding or laminating in order to obtain a monobloc rigid assembly forming the said shell for the electronic identification device.

A rigid body is thus obtained at the center of which the identifier is embedded, the wafers having the function of protecting the identifier during the final production phase of the token (pressing or thermoforming) and of ensuring good cohesion between the body and the covering sheets.

According to another embodiment of the invention, the shell is monobloc and obtained by injection molding:

In a first variant, the shell is obtained by injection of plastic, possibly filled, around the said electronic identification device.

In another variant, the shell is obtained by the overmolding injection of plastic over a hollow plastic half-shell carrying the electronic identification device. It may be pointed out that the two variants the injection molding [sic] provides a high degree of security for the token and good protection for the electronic identification device.

According to yet another embodiment of the invention, the shell is obtained by fastening a plastic cover onto a hollow disk, also made of plastic, carrying the electronic identification device.

Depending on the general structure of the token, the shell constitutes the body of the token or constitutes a central disk around which is overmolded an annular plastic ring in order to form the body of the token.

Advantageously, the plastic used for the shell is loaded, weightwise, with particles of nonferrous metals such as tungsten or bronze. In this way, the necessary ballast for the token is achieved inexpensively. Still advantageously, the plastic used for the shell is loaded with ferrite particles in order to improve the transmission performance of the said electronic identification device.

In order to combat theft of the tokens, the token according to the invention additionally includes means detectable by a detection frameway, these means being fixed or arranged in the body of the token, of the type consisting of an oriented film or filament made of active material or of alloy sensitive to the electromagnetic radiation.

It may be noted that in all the variants presented hereinabove, the permanent integration of the electronic identifier in the core of the body of the token is such that it is impossible to change the casing identifier without destroying the token. This integration also provides good protection against the risk of damage of the identifier when handling the token.

The invention also relates to the methods of manufacturing the tokens and chips presented hereinabove.

Other features and advantages of the present invention will appear on reading the following description of several embodiments of the invention and of their variants, given by way of nonlimiting examples, with reference to the hereto appended drawings in which:

FIG. 1 represents a perspective view of a casino chip according to the present invention;

FIG. 2 represents a longitudinal sectional view in a plane perpendicular to the chip and passing through the line A—A of the chip illustrated in FIG. 1;

FIG. 3 represents a front view of an injection-molded gaming token called an "American" token according to the present invention; and FIG. 4 represents a diametral sectional view in a plane perpendicular to the token of the token illustrated in FIG. 3;

FIGS. 5a (plan view) and 5b to 5d (diametral sectional views) illustrate diagrammatically the various phases in the manufacture of another embodiment of an "American" token of the type illustrated in FIG. 3; and FIGS. 6a to 6b illustrate diagrammatically the final phase in the manufacture of yet another embodiment of an "American" token.

Referring to FIG. 1, this shows in perspective a substantially rectangular casino chip 10. Purely by way of indication, the chip has dimensions of 8×12 cm and approximately 6 mm in thickness. The body 12 of the chip is made by laminating plastic sheets, for example sheets of cellulose acetate having thicknesses chosen between a few tenths of a mm and a few millimeters. The outer sheets are generally transparent in order to reveal the pattern of each face of the chip. After laminating the sheets, the final shape of the chip is obtained by a thermoforming process which also makes it possible to provide a relief on the faces of the chip, the latter then taking the form of a monobloc rigid assembly which is virtually impossible to delaminate.

The thick body 12 of the chip includes a circular through-opening 14 in which is placed an electronic identification device 15 which includes an electronic circuit (not visible in the figures) encapsulated in a protective casing 16 which takes the form of a flat cylinder of 20 mm in diameter and having a thickness less than 1 mm. As illustrated in FIG. 2, the casing 16 is placed in the opening 14 between two plastic protective wafers 18 and 20, the thickness of which is chosen so that they are substantially flush with each face 19 and 21 of the body 12. The protective wafers or capsules are preferably made by laminating sheets of cellulose acetate, followed by a punch cutting operation. The inserts, formed by the casing 16 and its protective wafers 18 and 20 are fastened by attaching, in this case by laminating, two cellulose acetate covering sheets 22 and 24 on the respective faces 19 and 21 of the body 12 of the chip. After laminating the sheets 22 and 24, the final shape of the chip 10 and its final cohesion is achieved by a thermoforming operation, the chip 10 incorporating the body 12 forming a monobloc rigid shell holding captive the electronic identification device.

It should be noted that the variant described here of an embodiment of the invention relates to a casino chip. Without departing from the scope of the invention, this variant also covers gaming tokens of the "French" token type in which the body is obtained by laminating plastic sheets, for example sheets of cellulose acetate. The dimensions, given by way of indication, of these tokens are of the order of 5 cm in diameter for a thickness of 3 mm.

In the variant described here in a nonlimiting manner, the electronic identification device encapsulated in the casing 16 includes an electronic circuit mainly consisting of a memory of the PROM (programmable read-only memory) type containing a fixed 64-bit numeric or alphanumeric identification code and of a transmitter-receiver assembly and the antenna of the transmitter-receiver, the latter being capable of exchanging data with a fixed reading station approximately 15 cm away, the working frequency lying between 10 kHz and 20 MHz. The electronic circuit is supplied by inductive coupling at the antenna of the transmitter-receiver. Without departing from the scope of the invention, the casing may be replaced in order to save space, in terms of thickness, by an epoxy capsule encapsulating the electronic circuit and the associated antenna.

Of course, the invention is not limited to the electronic identification device of the "passive" type described here, but also covers all other electronic circuits, whether passive or active, allowing identification in the widest sense mentioned hereinabove, and in particular circuits with changing code, that is to say circuits which allow writing in addition to reading. This latter function is highly beneficial for security and for monitoring (in space and/or over time) the chip or the token. Likewise, the use of UHF electronic circuits makes it possible to increase the reading distance (which provides these circuits with a useful detection function from the standpoint of combating theft) and the read/write speeds. These comments are applicable to the electronic circuits which can be used in the other embodiments of the invention which are described hereinbelow with reference to FIGS. 3, 4, 5a to 5d and 6a–6b.

The invention also relates to the method of manufacturing the token or chip described hereinabove, which method includes the following operations:

1. Manufacture of the chip body by laminating plastic sheets, in particular those made of cellulose acetate.
2. Drilling a hole through the body to the diameter of the casing of the electronic identification device.
3. Manufacture of the protective wafers or capsules by laminating plastic sheets, in particular sheets of cellulose acetate, and cutting, with a punch, to the diameter of the hole, the thickness of the wafers being chosen with respect to that of the casing in order to fill exactly the hole of the body with the wafer/casing/wafer assembly (bringing to the same level the surfaces in contact with the sheets 22 and 24, as illustrated in FIG. 2).
4. Putting the body of the casing, gripped by its two protective wafers, in the hole in the body.
5. Laminating one or more sheets of plastic, in particular cellulose acetate, onto the two faces of the body.
6. Trimming the chip.
7. Final shaping of the body of the chip by thermoforming.

The body of the chip may be made from presized sheets. However, for small-sized pieces, for example the "French" tokens, a chip blank is firstly made to the desired thickness, but the other dimensions of which may be up to one meter. The chip blank is next drilled with a number of holes corresponding to the number of tokens or chips to be produced, cutting out (using a punch or a milling cutter) the token or chip, fitted with its electronic identification device, taking place after the operation of laminating the covering sheets once the electronic identification devices have been put into place.

Of course, the invention is not limited to the production of a body made of laminated (or welded) sheets of cellulose acetate but also covers other variants using, for the production of the body of the token, plastic sheets and/or plaques capable of being adhesively bonded, welded or laminated to one another. In yet other variants of the invention, the body of the plastic token or chip is obtained by injection.

It should be noted that the use of sheets of plastic of the same material for the body, the protective capsules and the covering sheets promotes cohesion of the assembly and ensures complete integration of the electronic identification device in the body of the chip or token. Cellulose acetate is particularly suitable for this type of operation, welding by laminating being relatively easy at temperatures and pressures that do not risk the electronic circuit being destroyed. For this purpose, welding is facilitated by using organic solvents.

FIGS. 3 and 4 relate to another embodiment of the invention, applied in particular to tokens with a body injected by overmolding, of the "American" token type. In this type of token, the body 40 consists of an annular plastic ring 42 overmolded over a ballast-forming central disk 44, the levelling of each face of the token being provided by labels 46 and 48 bearing a pattern and adhesively bonded to the disk 44 or attached to the token by any suitable means (see in particular FIG. 4 showing the token in section). The ring 42 is preferably made of polyamide, PA-6 or PA-6,6, possibly baryte-filled, and can be subjected to successive injections of plastics of different colors in mold cavities of varied intermediate shapes so as to produce a multicolored pattern (not shown) throughout the body of the token.

According to the invention, the rigid shell allowing integration of an electronic identification device 49 with its casing 50 carrying the electronic identification circuit and the antenna (similar to the elements represented by the reference numbers 15 and 16 hereinabove) is consolidated with the ballast-forming disk 44, the electronic identification device 49 being embedded in the ballast-forming disk 44, held captive in the rigid plastic of which it is composed. Advantageously, the disk 44 is made by injecting plastic, for example polyamide PA-6 or PA-6,6, filled with fine particles and/or balls of nonferrous metals, preferably tungsten or bronze, in order to obtain an appropriate ballast weight. To this end, the electronic identification device 49 (casing 50 including its associated electronic circuit) is placed in the mold of an injection press, the mold being designed to obtain a flat cylindrical disk 44 to well-defined shapes and sizes, in particular in order to allow subsequent overmolding operations of a ring 42. It may be seen in FIGS. 3 and 4 that, in order to increase the security of the arrangement according to the invention, the area taken up by the ring 42 partially overlaps the casing 50, the overmolding of the ring 42 providing permanent integration of the shell 44 in the body of the token.

Without departing from the scope of the invention, it is possible to replace, at the very least partly, the bronze loading of the ballast disk 44 with a ferrite loading in order to improve the transmission performance of the electronic identification device, the ferrite additionally being capable of acting as a weighting load.

It should be noted that the presence of the electronic identification device is compatible with other specific detection means used in anti-theft protection, in particular elements which are detectable in a detection gateway or frameway and constituted by at least one oriented film or a filament made of active material or of alloy sensitive to the electromagnetic radiation, these being fixed or arranged in the body of the token. For example, in the case of the token illustrated in FIGS. 3 and 4, the labels 46 and 48 each carry, on the inside, a thickness of oriented film (not shown) suitably attached by using two layers of transfer adhesive. When putting the labels 46 and 48 in place, it is important to arrange the orientation of the detectable films at 90° (within a few degrees) in order to improve detection.

FIGS. 5a to 5d show an embodiment variant of an American token in which the shell 44' (forming the ballast disk of a token 40') is obtained by overmolding injection of rigid plastic (for example a material chosen from those used for the above ballast disk 44) over a hollow half-shell 56 (obtained beforehand by injection molding the same material) and carrying the electronic identification device. As may be seen in FIG. 5a showing a plan view and FIG. 5b showing a sectional view of the half-shell 56 along the line B—B of FIG. 5a, the half-shell 56 includes a recess 57 acting as a housing for the electronic circuit 52 and for its peripheral antenna 54 (for example of the type composed of non-touching circular turns, illustrated in FIG. 5a) constituting the electronic identification device 49. The half-shell 56 and the electronic identification device 49 are placed in the mold 58–58' of an injection press, as illustrated in FIG. 5b, in order to obtain a rigid monobloc assembly forming the shell 44' shown in section in FIG. 5c. The token 40' is completed, according to the operating mode shown diagrammatically in FIG. 5d, by overmolding injection of the ring 42' over the shell 44' and putting on the labels 46 and 48.

FIGS. 6a and 6b illustrate the final manufacturing phase for another "American" token variant in which the shell 44" (forming the ballast disk of the token 40") is obtained by fastening a plastic cover 62 onto a hollow disk 60 carrying the electronic identification device 49, the hollow disk 60 (produced by injection molding) being provided with a recess similar to the recess 57, in order to accommodate the electronic circuit 52 and the antenna 54. The cover 62 and the disk 60 may be fastened by adhesive bonding or welding or else directly by the overmolding of the ring 42".

By way of an embodiment variant of the invention, the recesses in the half-shell 56 and in the hollow disk 60 may be modified in order to accommodate the electronic identifier encapsulated in a casing or encapsulated in an epoxy capsule.

Finally, without departing from the scope of the invention, some tokens consist just of a shell similar to those illustrated in FIGS. 5c and 6a, the difference lying in the diameter and the thickness of the shell forming the token compared to the shells 44' and 44".

I claim:

1. A gaming chip representing a value, comprising:
   a contactless electronic identification device;
   a rigid plastic shell, said shell substantially encapsulating said electronic identification device; and
   a body having an aperture, said shell being disposed within said aperture.

2. The gaming chip of claim 1, said electronic identification device further comprising:
   a memory for storing token identification information;
   an element effective to receive an external signal and transmit at least a portion of said token identification information responsive to receipt of said external signal; and
   a peripheral antenna having an inductive coupling, said antenna being connected to said receiver and said transmitter.

3. The gaming chip of claim 2, wherein said element is disposed in a center of said shell, and said antenna is disposed circumferentially about said element.

4. The gaming chip of claim 1, wherein said electronic identification device is disposed within a casing, and said casing is disposed within said shell.

5. The gaming chip of claim 1, wherein said shell is an injection molded plastic monobloc element.

6. The gaming chip of claim 1, wherein said shell consists of a half-shell and at cover, said half-shell and said cover being sealed together to encapsulate said electronic identification device.

7. The gaming chip of claim 6, wherein said cover is layer of plastic, injection molded over said half-shell and electronic identification element to form said shell.

8. The gaming chip of claim 1, wherein said shell is plastic having nonferrous metals suspended therein.

9. The gaming chip of claim 1, wherein said shell is plastic having particles suspended therein, said particles enhancing a transmission performance of said electronic identification device.

10. A gaming chip representing a value, comprising:

a central portion having substantially disk shape;

a body having an aperture, said central portion being disposed within said aperture;

first and second labels applied to top and bottom faces of said central portion, said first and second labels each having a detectable oriented film; and said first label being oriented at approximately 90 degrees relative to said second label.

11. The gaming chip of claim 10, wherein said detectable oriented film is an active material.

12. The gaming chip of claim 10, wherein said detectable oriented film is an alloy sensitive to electromagnetic radiation.

13. A gaming chip of value, comprising:

a body having a central portion and an outer portion, a thickness of said outer portion being greater than a thickness of said central portion;

first and second labels applied to top and bottom faces of said central portion, said first and second labels each having a detectable oriented film; and said first label being oriented at approximately 90 degrees relative to said second label.

14. The gaming chip of claim 13, wherein said detectable oriented film is an active material.

15. The gaming chip of claim 13, wherein said detectable oriented film is an alloy sensitive to electromagnetic radiation.

16. A method of manufacturing a gaming chip, comprising:

encoding a contactless electronic identification element with identification information;

substantially encapsulating said electronic identification element within a rigid plastic shell; and surrounding at least an outer peripheral portion of said shell within a ring.

17. The method of claim 16, wherein said encapsulating further comprises injection molding said shell over at least two sides of said electronic identification element.

18. The method of claim 17, wherein said encapsulating further comprises placing said electronic identification element into a casing, and injection molding plastic over said casing to form said shell.

19. The method of claim 18, wherein said electronic identification element includes a receiver/transmitter element connected to an antenna, wherein said step of placing further comprises:

positioning said receiver/transmitter element in a central portion of said half shell; and encircling said receiver/transmitter element with said antenna.

20. The method of claim 19, wherein said step of covering further comprises injection molding plastic over said half shell.

21. The method of claim 16, wherein said step of encapsulating comprises:

providing a half shell;

placing said electronic identification element in said half shell; and covering said half shell and electronic identification element.

22. The method of claim 21, wherein said step of covering further comprises fastening a plastic cover over said half shell.

23. A gaming chip representing a value, comprising:

a body having an opening;

a contactless electronic identification device disposed in said opening;

first and second rigid plastic plates in said opening on each side of said electronic identification device;

first and second covers disposed on top and bottom sides of said body to cover said opening.

24. A gaming chip representing a value, comprising:

an electronic identification device including a memory for storing chip identification information, an element effective to receive an external signal and transmit at least a portion of said chip identification information responsive to receipt of said external signal, and a peripheral antenna having an inductive coupling, said antenna being connected to said receiver and said transmitter;

said element being disposed within a casing;

a monobloc injection molded rigid shell, said shell encapsulating said casing;

a body having an aperture, said shell substantially being disposed within said aperture such that said element is disposed in a center of said shell, and said antenna is disposed circumferentially about said element.

25. A gaming chip representing a value, comprising:

an electronic identification device including a memory for storing chip identification information, an element effective to receive an external signal and transmit at least a portion of said chip identification information responsive to receipt of said external signal, and a peripheral antenna having an inductive coupling, said antenna being connected to said receiver and said transmitter;

a rigid plastic shell including a half-shell and a cover, said half-shell and cover being sealed to substantially encapsulate said electronic identification device;

a body having an aperture, said shell being disposed within said aperture;

said element being disposed in a center of said shell, and said antenna is disposed circumferentially about said element.

* * * * *